United States Patent
Dwivedi et al.

(10) Patent No.: US 9,491,658 B2
(45) Date of Patent: Nov. 8, 2016

(54) SYSTEMS AND METHODS FOR DETERMINING CONGESTION IN WIRELESS NETWORKS

(71) Applicant: QUALCOMM Incorporated, San Diego, CA (US)

(72) Inventors: Ashwani Dwivedi, Hyderabad (IN); Rajeev Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 13/828,480

(22) Filed: Mar. 14, 2013

(65) Prior Publication Data
US 2014/0269291 A1    Sep. 18, 2014

(51) Int. Cl.
*H04W 28/02* (2009.01)

(52) U.S. Cl.
CPC ................................. *H04W 28/0289* (2013.01)

(58) Field of Classification Search
USPC ........................................ 370/232, 235, 329
See application file for complete search history.

(56) References Cited

U.S. PATENT DOCUMENTS

| | | | |
|---|---|---|---|
| 7,916,658 B2 | 3/2011 | Balan et al. | |
| 2006/0019673 A1* | 1/2006 | Yagyu | H04W 72/08 455/454 |
| 2006/0292988 A1* | 12/2006 | Yuen et al. | 455/62 |
| 2011/0207485 A1* | 8/2011 | Dimou et al. | 455/507 |
| 2011/0305139 A1 | 12/2011 | Kwak et al. | |
| 2012/0115439 A1 | 5/2012 | Naito et al. | |
| 2013/0039181 A1* | 2/2013 | Chao | 370/235 |
| 2013/0107825 A1* | 5/2013 | Cherian et al. | 370/329 |

FOREIGN PATENT DOCUMENTS

| | | | |
|---|---|---|---|
| SG | 138482 | * | 1/2008 |
| SG | 138482 A1 | | 1/2008 |

OTHER PUBLICATIONS

Jardosh A.P., et al., "Understanding Congestion in IEEE 802.11b Wireless Networks," 2005, 14 pages.

* cited by examiner

*Primary Examiner* — Dang Ton
*Assistant Examiner* — Pamit Kaur
(74) *Attorney, Agent, or Firm* — Paradice and Li LLP

(57) ABSTRACT

Systems and methods are disclosed for determining network congestion. A wireless communications device may identify available networks and assess a congestion parameter for each wireless channel associated with those networks. Assessing congestion on a given channel may include identifying all access points operating on the channel and monitoring traffic associated with each access point. By performing this assessment for each channel, the channel exhibiting minimum congestions may then be selected.

24 Claims, 4 Drawing Sheets

SYSTEMS AND METHODS FOR DETERMINING CONGESTION IN WIRELESS NETWORKS

FIELD OF THE DISCLOSURE

This disclosure generally relates to wireless communication systems and more specifically to systems and methods for selecting among wireless communication channels based on congestion.

BACKGROUND

Wireless networks are increasingly employed to provide various communication functions including voice, video, packet data, messaging and the like. A common example of wireless local area network (WLAN) architecture is an infrastructure network adhering to 802.11 standards established by the Institute of Electrical and Electronics Engineers (IEEE) that typically employ one or more access points to coordinate communications for a number of stations or other client devices. In an infrastructure network, the access point and associated stations may be known as a basic service set (BSS).

Due to the wide availability, popularity and convenience of WLAN-based wireless communications, a wireless communications device may be within range of multiple WLANs at any given time. Often, very little information may be available to the wireless communications device regarding the quality of the network or the performance that may be expected regarding each WLAN. Indeed, the wireless communications device may only have information regarding the current signal strength of the network, the type of security being employed and, in some situations, the 802.11 protocols supported by the network that may indicate the theoretical maximum data rate. Thus, under conventional systems, choosing among the options may involve simply selecting a network identifier from a list on the basis of one or more of these criteria.

However, these criteria may not provide an adequate indicator of the network performance that may be expected. For example, a wireless communications device may be located close to a given access point, which may result in an indication that the network has excellent signal strength. However, if that access point is servicing a large number of other clients, or if other access points are operating on the same channel, performance of the network may be poor. Conversely, even if communications from another access point are received at reduced signal strength, when the WLAN served by that access point has few client devices with low activity, a wireless communications device may be able to utilize the WLAN at reasonable performance levels.

Accordingly, it would be desirable to provide systems and methods allowing a wireless communications device to determine the congestion present for networks within range. Further, it would be desirable for the wireless communications device to determine congestion on a unilateral basis, without requiring active involvement from other network devices. This disclosure satisfies these and other needs.

SUMMARY

This disclosure includes methods for determining network congestion in a wireless network. In one aspect, a suitable method may include determining by a wireless communications device an at least one access point operating on an at least one channel of the wireless network, monitoring by the wireless communications device traffic associated with the at least one access point for the at least one channel, and determining by the wireless communications device a congestion parameter for the at least one channel using the monitored traffic for the at least one access point. Further, the method may include determining the at least one access point further comprises for each channel determining a number of access points operating on the channel, monitoring traffic comprises, for each channel, monitoring traffic associated with each access point on the channel, and determining the congestion parameter further comprises using the number of access points to determine that congestion parameter. The number of access points operating on each channel may be determined by sending a probe request and receiving a probe response from any access points in range on each channel. Further, an identifier for each access point may be determined from the probe response. In addition, monitoring traffic associated with each access point may include filtering packets based on the identifier for each access point.

In another aspect, determining the congestion parameter may include summing a number of packets exchanged by each assess point and a factor based on the number of access points on each channel. The factor may include a weighting coefficient. Further, suitable methods may include selecting one access point based on the determined congestion parameters.

This disclosure also includes systems for wireless communication. In one aspect, suitable systems may include a wireless communications device having a transceiver for wirelessly communicating on at least one channel of a wireless network and a congestion manager configured to determine at least one access point operating on at least one channel of the wireless network, monitor traffic associated with the at least one access point for the at least one channel, and determine a congestion parameter for the at least one channel using the monitored traffic for the at least one access point. Further, the congestion manager may determine the at least one access point by determining for each channel a number of access points operating on the channel, monitoring traffic by monitoring for each channel traffic associated with each access point on the channel, determining the congestion parameter using the number of access points. The congestion manager may determine the number of access points operating on each channel by sending a probe request and receiving a probe response from any access points in range on each channel. Further, the congestion manager may determine an identifier for each access point from the probe response. In addition, the congestion manager may monitor traffic associated with each access point by filtering packets based on the identifier for each access point.

In one aspect, the congestion manager may determine a number of packets exchanged by the at least one access point and sum the number of packets with a factor related to the number of access points on the at least one channel to determine the congestion parameter. The factor based on the number of access points on each channel may include a weighting coefficient.

In another aspect, the congestion manager may select one access point based on the determined congestion parameters.

This disclosure may also include a non-transitory processor-readable storage medium for determining network congestion with a wireless communications device in a wireless network, the processor-readable storage medium having instructions thereon, the instructions including code for determining an at least one access point operating on an at least one channel of the wireless network, code for monitoring device traffic associated with the at least one access point for the at least one channel, and code for determining a congestion parameter for the at least one channel using the monitored traffic for the at least one access point. Further, the storage medium may include code for determining the at least one access point further comprises for each channel code for determining a number of access points operating on the channel, code for monitoring traffic comprises, for each channel, code for monitoring traffic associated with each access point on the channel, and code for determining the congestion parameter further comprises code for using the number of access points to determine that congestion parameter.

The code for determining the number of access points operating on each channel may include code for sending a probe request and code for receiving a probe response from any access points in range on each channel. Further, the storage medium may include code for determining an identifier for each access point from the probe response. In such embodiments, the code for monitoring traffic associated with each access point may include code for filtering packets based on the identifier for each access point.

In one aspect, the code for determining the congestion parameter may include code for determining a number of packets exchanged by the at least one access point and code for summing the number of packets with a factor related to the number of access points on the at least one channel. The factor may include a weighting coefficient.

In another aspect, the storage medium may also have code for selecting one access point based on the determined congestion parameters.

Another system for wireless communication of the disclosure may include a wireless communications device having a transceiver for wirelessly communicating on at least one channel of a wireless network and a congestion manager configured to determine at least one access point operating on at least one channel of the wireless network, monitor traffic associated with the at least one access point for the at least one channel, and determine a congestion parameter for the at least one channel using the monitored traffic for the at least one access point, means for determining at least one access point operating on at least one channel of the wireless network, means for monitoring traffic associated with the at least one access point for the at least one channel, and means for determining a congestion parameter for the at least one channel using the monitored traffic for the at least one access point. Further, the means for determining at least one access point may determine the at least one access point by determining for each channel a number of access points operating on the channel, the means for monitoring traffic may monitor for each channel traffic associated with each access point on the channel, and the means for determining a congestion parameter may determine the congestion parameter using the number of access points.

In one aspect, the wireless communications device may include means for determining the number of access points operating on each channel by sending a probe request and receiving a probe response for each access point in range on a channel. The wireless communications device may also include means for determining an identifier for each access point from the probe response. Still further, the wireless communications device may include means for monitoring traffic associated with each access point by filtering packets based on the identifier for each access point.

The wireless communications device may also include means for determining the congestion parameter by determining a number of packets exchanged by the at least one access point and summing the number of packets with a factor related to the number of access points on the at least one channel. The factor based on the number of access points on each channel may include a weighting coefficient.

In another aspect, the wireless communications device may include means for selecting one access point based on the determined congestion parameters.

BRIEF DESCRIPTION OF THE DRAWINGS

Further features and advantages will become apparent from the following and more particular description of the preferred embodiments, as illustrated in the accompanying drawings, and in which like referenced characters generally refer to the same parts or elements throughout the views, and in which.

DETAILED DESCRIPTION

Figure 1:
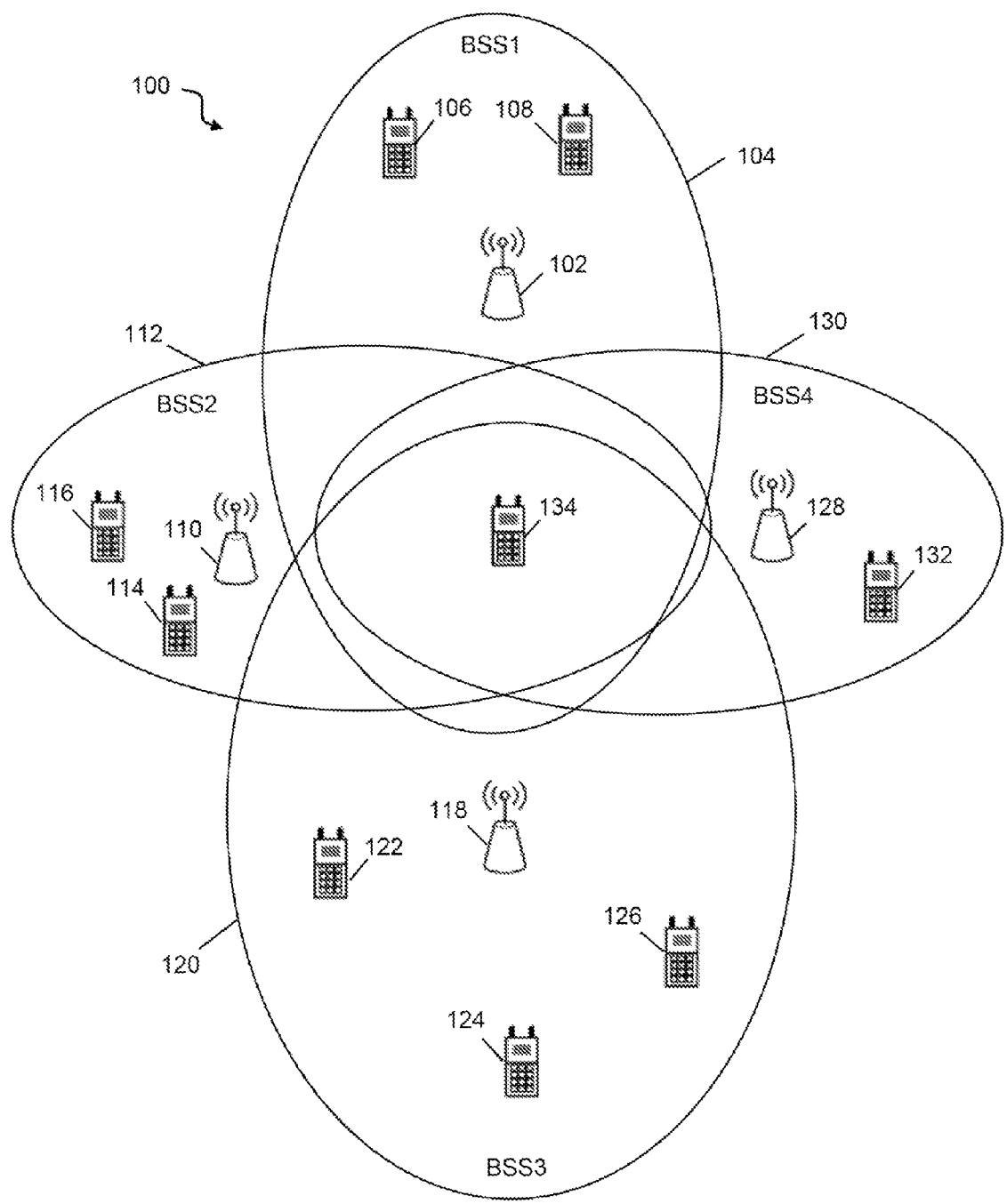
FIG. 1 schematically depicts a wireless environment including multiple wireless networks, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the invention in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the invention in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a", "an" and "the" include plural referents unless the content clearly dictates otherwise.

In contrast to the conventional criteria of signal strength (e.g., Received Signal Strength Indication, RSSI), the congestion present on a wireless channel of a network may provide a better estimate of the performance of a network. To help illustrate aspects of this disclosure, an exemplary wireless environment 100 featuring multiple BSSs is schematically depicted in FIG. 1. As shown, access point (AP) 102 may support BSS1 104, having two associated client devices 106 and 108. Next, AP 110 may support BSS2 112 and also have two associated client devices 114 and 116. Further, AP 118 may support BSS3 120 and have three associated client devices 122, 124 and 126. Finally, AP 128 may support BSS4 130 and have a single associated client device 132. Under the 802.11 protocols, a BSS at any given time may operate on one of a plurality of frequency bands and, more specifically, on one channel within that frequency band. Here, BSS2 112 and BSS4 130 operate on a first channel, BSS1 104 operates on a second channel and BSS3 120 operates on a third channel. The second and third channels may or may not be in the same frequency band. FIG. 1 is presented as a simplified example only and under many practical situations, typical APs may support greater numbers of associated client devices and greater numbers of APs may be involved. Thus, even though four separate BSSs are depicted, the techniques of this disclosure may be applied when any number of WLANs are present. Further, this example and the following discussion refers generically to BSSs and APs. In one aspect, this may include a BSS, managed by an AP and operating in infrastructure mode. However, these techniques may also be applied to an independent basic service set (IBSS) operating in ad-hoc mode or other similar peer-to-peer architectures, such as WiFi Direct™. Each BSS may be associated with an AP or, in the case of an IBSS, a device currently acting in an access point role, which will be referred to simply as an access point for the purposes of this disclosure. Further, for the purposes of this disclosure, references to BSSs include IBSSs or other peer-to-peer equivalents.

Accordingly, wireless communications device 134 is shown as being within range of each AP (AP 102, AP 110, AP 118 and AP 128) and therefore may have the option to associated with any of the BSSs (BSS1 104, BSS2 112, BSS3 120, or BSS4 130). To determine the likely network performance that may be experienced on each BSS, wireless communications device 134 may be configured to estimate a congestion parameter associated with each BSS through use of an evaluation process. In one aspect, the congestion parameter may correspond to the congestion determined for the wireless channel on which the BSS is operating. In turn, wireless communications device 134 may preferentially connect with an AP operating on a relatively less congested channel in order to optimize performance.

Figure 2:
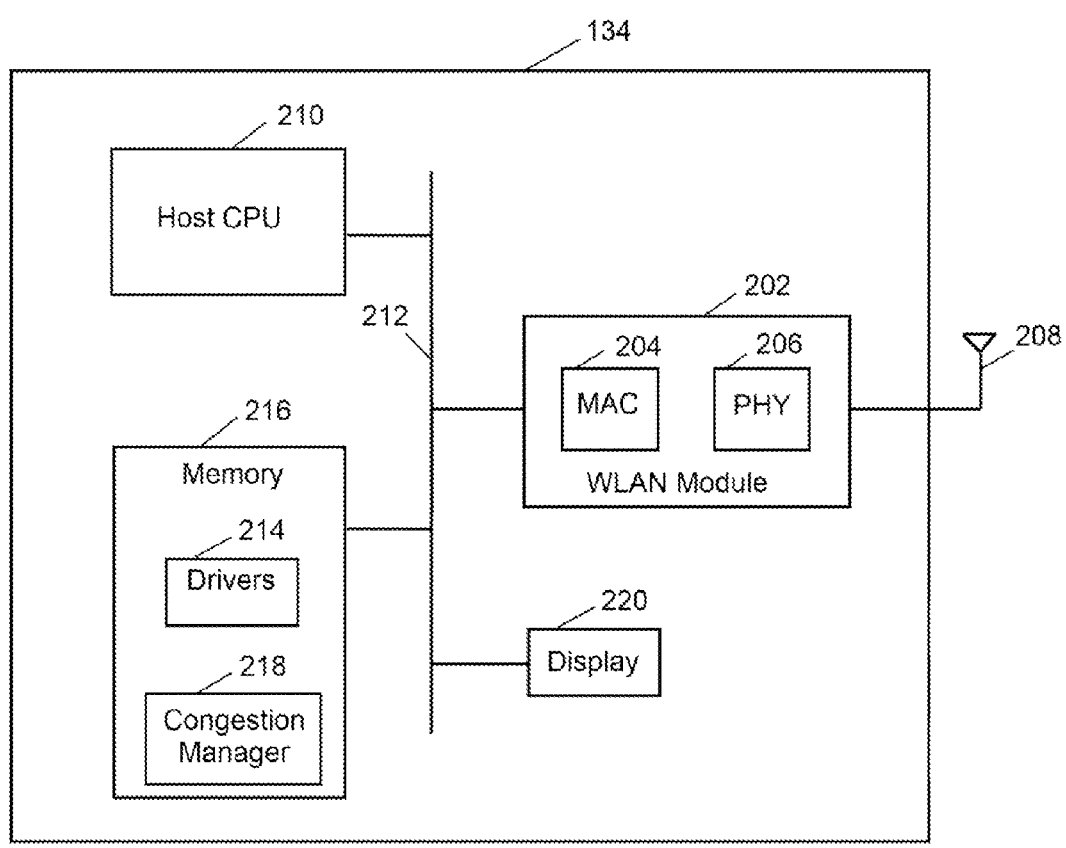
FIG. 2 schematically depicts functional blocks of a wireless communications device configured to determine network congestion, according to one embodiment.

Turning now to FIG. 2, functional blocks of wireless communications device 102 associated with the reception and transmission of signals in a WLAN are depicted. Generally, wireless communications device 134 may employ an architecture in which the lower levels of the WLAN protocol stack are implemented through firmware and/or hardware in WLAN module 202. As shown, WLAN module 202 implements a data link layer and controls access to the wireless medium through media access controller (MAC) 204 which may be configured to perform functions related to the handling and processing of frames of data including verification, acknowledgment, routing, formatting and the like. Incoming and outgoing frames are exchanged between MAC 204 and physical layer (PHY) 206. Together, MAC 204 and PHY 206 modulate frames of information according to the WLAN protocol and provide the analog processing and RF conversion necessary to transmit and receive wireless signals through antenna 208. For illustration purposes only, one antenna is shown for WLAN module 202, but wireless communications device 134 may include multiple antennas to support multiple radio access technologies (RATs) or to allow use of multiple streams in multiple input multiple output (MIMO) systems or in multiple concurrent systems such as a dual band dual concurrent (DBDC) system. Further, wireless communications device 102 may be configured to share any number of antennas between the other RATs that may be implemented in wireless communications device 134 using conventional antenna switching techniques.

Wireless communications device 134 may also include host processor (CPU) 210 configured to perform the various computations and operations involved with the functioning of wireless communications device 134. CPU 210 is coupled to WLAN module 202 through bus 212, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the WLAN protocol stack may be implemented in software as Drivers 214 stored in memory 216 that may be accessed by CPU 210 over bus 212.

As shown, wireless communications device 134 may include congestion manager 218 implemented as processor-readable instructions stored in memory 216 that may be executed by CPU 210 to estimate a congestion parameter for available BSSs according to the techniques of this disclosure. For example, congestion manager 218 may be configured to determine the number of APs operating on each channel and to determine an amount of traffic associated with each AP. Based on these determinations, congestion manager 218 may assign a congestion parameter to each channel, and correspondingly, to the BSS or BSSs operating on that channel. In one aspect, results of the congestion determination by congestion manager 218 may be provided to a user through display 220.

Figure 3:
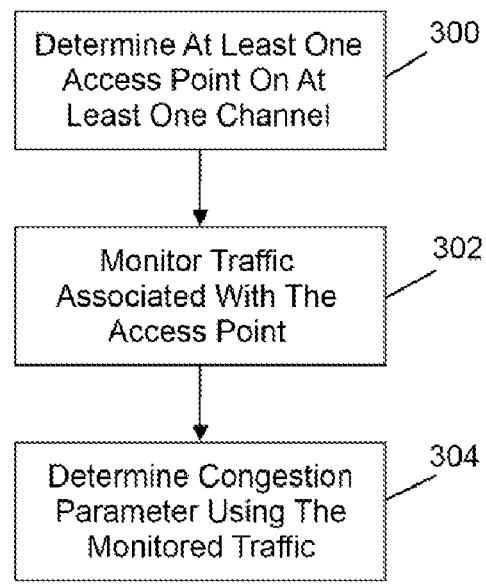
FIG. 3 is a flowchart showing an exemplary routine for determining congestion parameters, according to one embodiment.

One suitable example of the techniques of this disclosure for determining network congestion is represented by the flowchart of FIG. 3. As indicated, beginning with 300, congestion manager 218 may determine at least one AP operating on at least one wireless channel. Next, in 302, congestion manager 218 may monitor wireless traffic associated with the at least one AP, such as frames transmitted to or received by the AP. Based on the monitored traffic, congestion manager 218 may determine a congestion parameter for the channel as indicated by 304.

Figure 4:
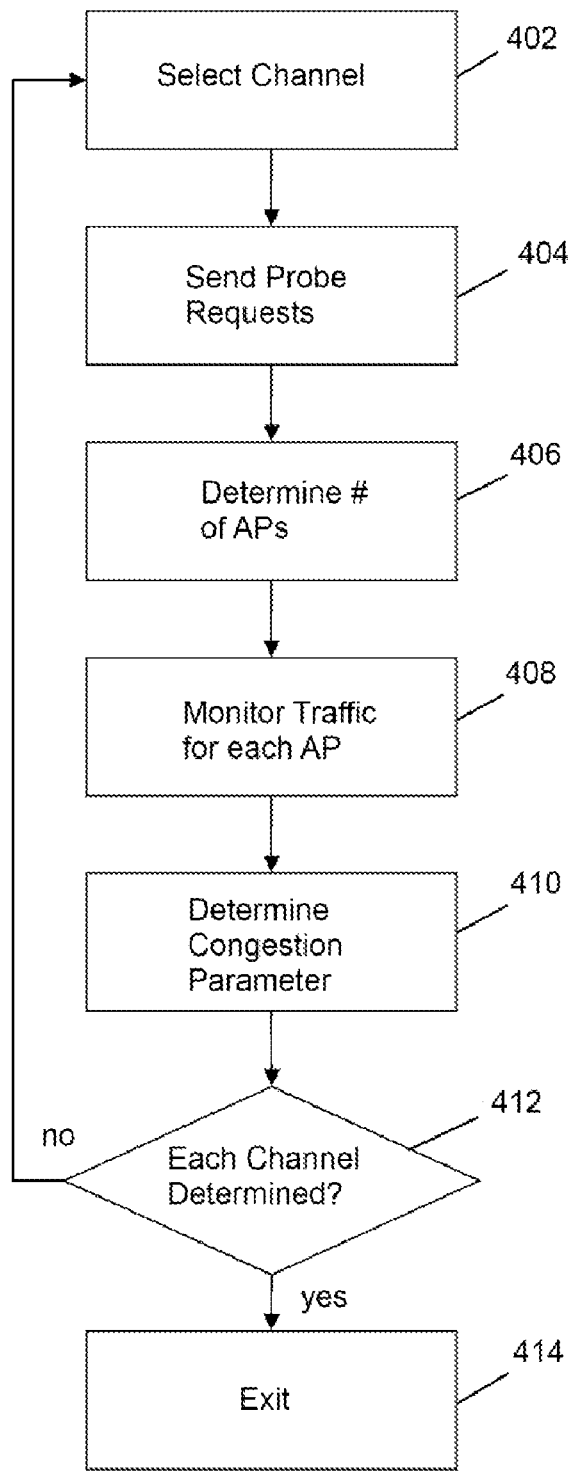
FIG. 4 is a flowchart showing an exemplary routine for determining congestion parameters based on the number of access points operating on a plurality of wireless channels, according to one embodiment.

A more detailed example of determining network congestion based on determining the number of APs operating on a plurality of channels is represented by the flowchart of FIG. 4. Initially, congestion manager 218 may determine the existence and number of APs corresponding to each BSS in range. As shown, the process may begin in 400 by selecting a channel from the available channels given the current operating frequency. Next, congestion manager 218 may send one or more probe requests on the selected channel in 402. Based on the probe responses received, congestion manager 218 may identify each BSS operating on the channel. Therefore, the total number of APs operating on the channel may be determined from the received probe responses in 404

Following determination of the number of APs, congestion manager 218 may then assess the amount of traffic associated with each AP. In one aspect, congestion manger 218 may be configured to filter traffic sent over the channel for a predefined period of time in 406. Each BSS may have a unique BSS identifier (BSSID), which is typically the media access control (MAC) address of the AP. According to 802.11 protocols, each packet sent within a WLAN includes an address field including the corresponding BSSID. In such embodiments, congestion manager 218 may correlate each packet transmitted over the channel to the AP that sent or received the packet and count the number of packets for each AP. This monitoring period may be configured as desired and, as an example only, may be approximately 50 ms. As a result, the total number of packets sent for each BSSID may be determined.

From the number of APs and their associated traffic, congestion manager 218 may determine a suitable a congestion parameter representing the network congestion for the channel being assessed in 408. In one aspect, the congestion parameter may include a sum of factors relating to the total number of packets sent over the channel and/or the total number of APs. To provide a better estimate of actual congestion, these factors may be weighted as desired. In one aspect, the number of APs on a channel may be multiplied by a predetermined or dynamically assigned coefficient to reflect that the existence of an AP on the channel represents an increased probability of future congestion, even if not indicated by the current traffic level, as well as overhead corresponding to the management functions performed by an AP. The number of APs present on the channel may be weighted by a factor (e.g., 10) with respect to the total number of packets sent in one embodiment. In another embodiment, the weighting coefficient may be determined dynamically based upon any suitable condition, such as the number of APs. For example, a weighting factor of 10 may be applied when an average number of APs are present, such as approximately 4-5, a lower factor may be applied when fewer APs are present and a higher factor may be applied when more APs are present.

The routine may loop as necessary so that a congestion parameter is determined for each channel on the current frequency band. If desired, and if wireless communications device 134 has the requisite capability, the routine may also progress through available channels on one or more additional frequency bands. For example, congestion manager 218 may determine whether each available channel has been assessed within a given threshold of time as indicated by 410, returning to 400 if not and exiting through 412 if a congestion parameter has been determined for all channels. As desired, a routine for determination of congestion such as described above may be automatically triggered after a desired interval to provide current congestion information or may be manually implemented.

In one aspect, the congestion parameter may be displayed using a visual icon or other suitable representation for each BSS, allowing the user of the wireless communications device to select a network that may be expected to provide good performance. Alternatively, the wireless communications device may be configured to automatically select a network exhibiting the least congestion or congestion below a given threshold. In a further aspect, if two or more BSSs are operating on a channel that has been determined to have a desired congestion level, congestion manager 218 may also report an AP parameter reflecting the number of packets associated with each BSS.

Further illustrations of the techniques of this disclosure for congestion parameter determination are provided in the context of wireless environment 100, shown in FIG. 1. As noted above, BSS2 112 and BSS4 130 may be configured to operate on a first channel, BSS1 104 may be configured to operate on a second channel and BSS3 120 may be configured to operate on a third channel. Accordingly, with respect to the first channel, congestion manger 218 may determine the existence of BSS2 112 and BSS4 130. When monitoring the first channel for the predetermined time, congestion manager 218 may count packets being exchanged between AP 110 and client devices 114 and 116 as well as packets being exchanged between AP 128 and client device 132. Congestion manager 218 may then determine a congestion parameter for the first channel as the sum of the packets exchanged and the number of APs (2) multiplied by a weighting factor. Next, with respect to the second channel, congestion manager 218 may determine that only one AP, AP 102, is operating on this channel and count the packets exchanged with client devices 106 and 108. In turn, the congestion parameter may be determined as the sum of the packets exchanged and one multiplied by a weighting factor. Since the number of APs present on the second channel is close to the number operating on the first channel, it may be desirable to employ the same weighting factor. For the last BSS depicted in this example, BSS 120 operating on the third channel, the congestion parameter may be determined as the sum of the packets exchanged between AP 118 and client devices 122, 124 and 126.

By using the congestion parameter determinations described above, wireless communications device 134 through the use of congestion manager 218 may make an enhanced congestion estimation regarding the available networks. As one example, if each depicted client device is determined to have the same amount of traffic, the congestion parameter for the first channel may be greater than the congestion parameter for the third channel. Even though both channels have the same number of client devices, the presence of two APs, as further adjusted by the weighting factor, results in a greater congestion parameter for the first channel. As a further example, again assuming each client device has the same level of activity for simplicity, the congestion parameter determinations may indicate that better network performance may be available through BSS1 104 than through BSS4 130. Even though BSS4 130 has fewer client devices associated with it, it is operating on the first channel which may have a greater congestion parameter than the second channel under the conditions of this example. Differences in the relative activity levels of the client devices may influence the congestion parameters accordingly.

Described herein are presently preferred embodiments. However, one skilled in the art will understand that the principles of this disclosure can be extended easily with appropriate modifications to other applications.

What is claimed is:

1. A method for determining network congestion in a wireless network, comprising:
   determining by a wireless communications device for a plurality of channels of the wireless network a number of access points operating on each channel;
   monitoring by the wireless communications device traffic associated with each access point of each channel; and
   determining by the wireless communications device a congestion parameter for each channel using the monitored traffic and the number of access points for each channel;
   wherein determining the congestion parameter further comprises determining a number of packets exchanged by each access point of each channel and summing the number of packets with a factor related to the number of access points on each channel.

2. The method of claim 1, wherein determining the number of access points operating on each channel comprises, for each access point in range on a channel, sending a probe request and receiving a probe response from the access point.

3. The method of claim 2, further comprising determining an identifier for each access point from the probe response.

4. The method of claim 3, wherein monitoring traffic associated with each access point comprises filtering packets based on the identifier for each access point.

5. The method of claim 1, wherein the factor includes a weighting coefficient.

6. The method of claim 1, further comprising selecting one access point based on the determined congestion parameters.

7. A wireless communications device comprising:
   a transceiver for wirelessly communicating on at least one channel of a wireless network; and
   a congestion manager configured to:
   determine for a plurality of channels of the wireless network a number of access points operating on each channel;
   monitor traffic associated with each access point of each channel; and
   determine a congestion parameter for each channel using the monitored traffic and the number of access points for each channel;
   wherein the congestion parameter is determined by determining a number of packets exchanged by each access point of each channel and summing the number of packets with a factor related to the number of access points on each channel.

8. The wireless communications device of claim 7, wherein the congestion manager further to determine the number of access points operating on each channel by sending a probe request and receiving a probe response for each access point in range on a channel.

9. The wireless communications device of claim 8, wherein the congestion manager further to determine an identifier for each access point from the probe response.

10. The wireless communications device of claim 9, wherein the congestion manager further to monitor traffic associated with each access point by filtering packets based on the identifier for each access point.

11. The wireless communications device of claim 7, wherein the factor includes a weighting coefficient.

12. The wireless communications device of claim 7, wherein the congestion manager further to select one access point based on the determined congestion parameters.

13. A non-transitory processor-readable storage medium for determining network congestion with a wireless communications device in a wireless network, the processor-readable storage medium having instructions thereon, the instructions comprising:
   code for determining fir a plurality of channels of the wireless network a number of access points operating on each channel;
   code for monitoring device traffic associated with each access point of each channel; and
   code for determining a congestion parameter for each channel using the monitored traffic and the number of access points for each channel;
   wherein the code for determining the congestion parameter further comprises code for determining a number of packets exchanged by each access point of each channel and summing the number of packets with a factor related to the number of access points on each channel.

14. The storage medium of claim 13, wherein code for determining the number of access points operating on each channel comprises, for each access point in range on a channel, code for sending a probe request and receiving a probe response from the access point.

15. The storage medium of claim 14, further comprising code for determining an identifier for each access point from the probe response.

16. The storage medium of claim 15, wherein code for monitoring traffic associated with each access point comprises code for filtering packets based on the identifier for each access point.

17. The storage medium of claim 13, wherein the factor includes a weighting coefficient.

18. The storage medium of claim 13, further comprising code for selecting one access point based on the determined congestion parameters.

19. A wireless communications device comprising:
   a transceiver for wirelessly communicating on at least one channel of a wireless network;
   means for determining for a plurality of channels of the wireless network a number of access points operating on each channel;
   means for monitoring traffic associated with each access point of each channel; and means for determining a congestion parameter for each channel using the monitored traffic and the number of access points for each channel;

wherein the means for determining the congestion parameter further comprise means for determining a number of packets exchanged by each access point of each channel and summing the number of packets with a factor related to the number of access points on each channel.

20. The wireless communications device of claim 19, further comprising means for determining the number of access points operating on each channel by sending a probe request and receiving a probe response for each access point in range on a channel.

21. The wireless communications device of claim 20, further comprising means for determining an identifier for each access point from the probe response.

22. The wireless communications device of claim 21, further comprising means for monitoring traffic associated with each access point by filtering packets based on the identifier fir each access point.

23. The wireless communications device of claim 19, wherein the factor includes a weighting coefficient.

24. The wireless communications device of claim 19, further comprising means for selecting one access point based on the determined congestion parameters.

* * * * *